Figure 1:
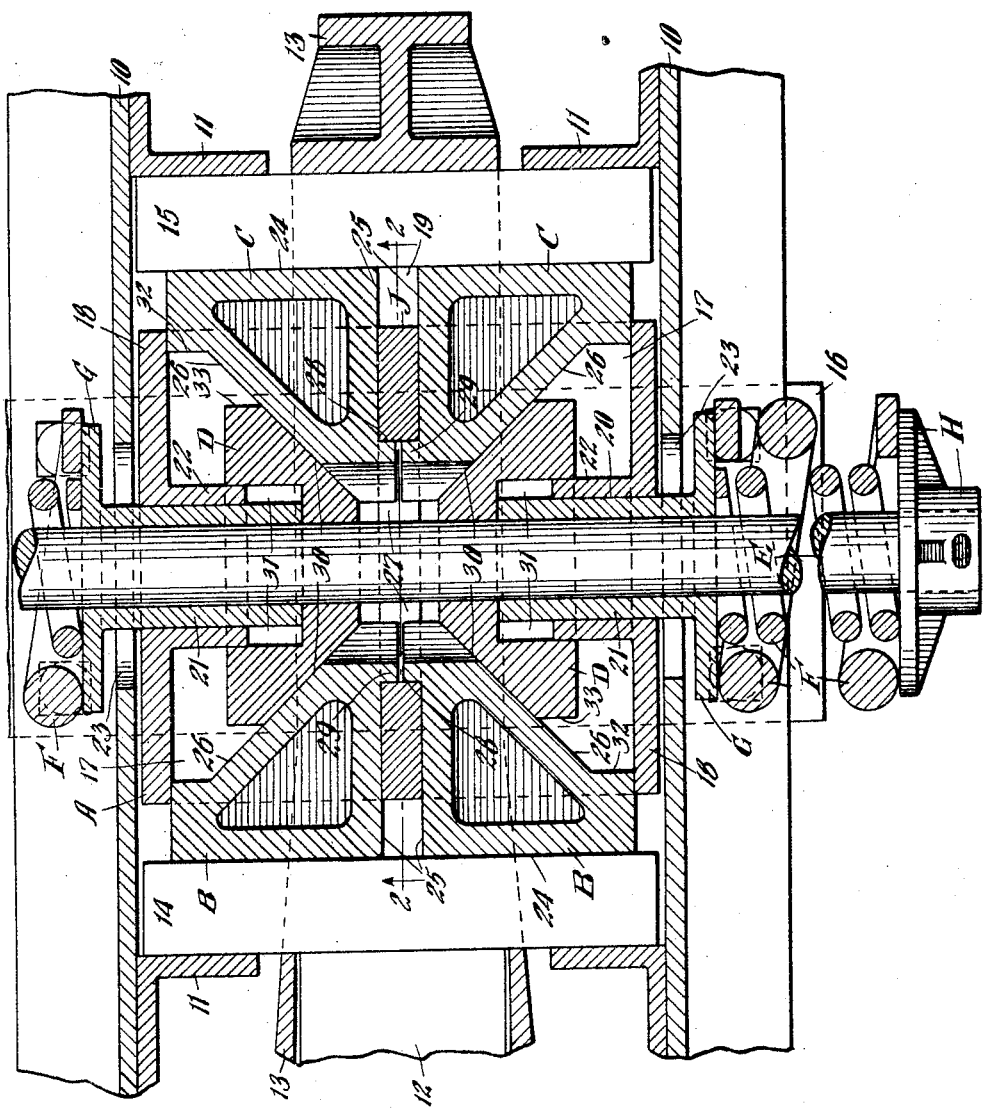

June 22, 1926.

J. F. O'CONNOR 1,589,420

FRICTION SHOCK ABSORBING MECHANISM

Filed July 5, 1923   2 Sheets-Sheet 1

Witnesses
Wm. Geiger

Inventor
John F. O'Connor
By George J. Haigh, Atty.

June 22, 1926. 1,589,420
J. F. O'CONNOR
FRICTION SHOCK ABSORBING MECHANISM
Filed July 5, 1923 2 Sheets-Sheet 2
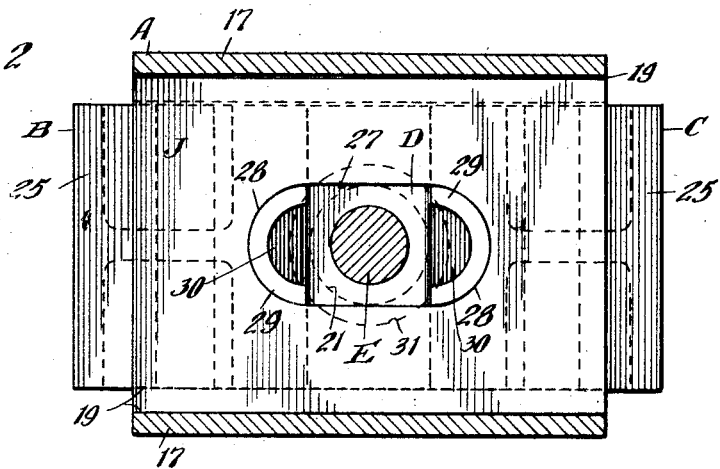
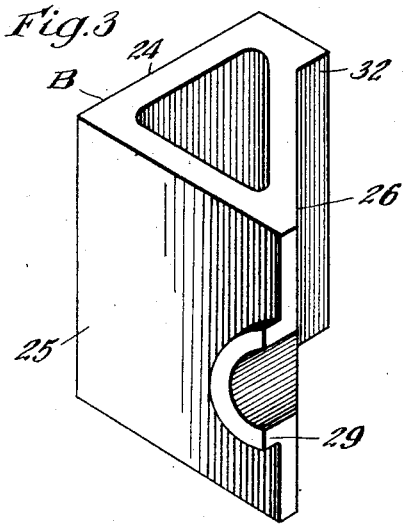 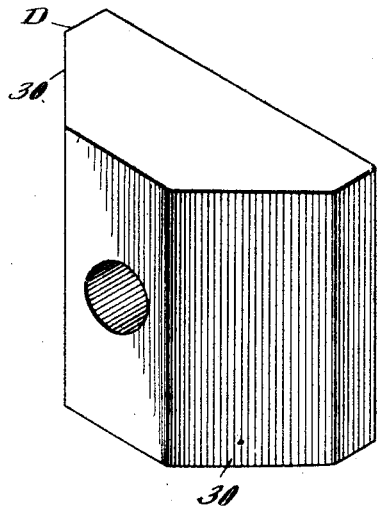
Witnesses
Wm. Geiger
Inventor
John F. O'Connor
By George I. Haight
His Atty.

Patented June 22, 1926.

1,589,420

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed July 5, 1923. Serial No. 649,425.

This invention relates to improvements in friction shock absorbing mechanisms.

The object of the invention is to provide a friction shock absorbing mechanism, especially adapted for railway draft riggings, wherein are provided large friction areas to produce high capacity, and more especially a mechanism of that type wherein is employed a spring resistance compressible in a direction transverse to the line of applied force.

In the drawings forming a part of this specification, Figure 1 is a longitudinal, horizontal sectional view of a portion of a railway draft rigging, showing my improvements in connection therewith. Figure 2 is a longitudinal vertical sectional view of the shock absorbing mechanism proper corresponding to the line 2—2 of Figure 1. And Figures 3 and 4 are detail perspective views of two of the friction elements employed in the mechanism.

In said drawings, 10 denote the usual draft sills of a car underframe to the inner faces of which are secured front and rear stop lugs 11—11 of usual construction. A portion of a drawbar is indicated at 12, the same being opratively associated with the shock absorbing mechanism proper by a hooded cast yoke 13 within which is disposed said mechanism and front and rear main followers 14 and 15, respectively. The yoke and parts therewithin are supported in operative position by a saddle plate 16.

The improved shock absorbing mechanism proper, as shown, comprises a substantially rectangular housing or casing A; a front pair of longitudinally movable wedge friction elements B—B; a rear pair of similar wedge friction elements C—C; a pair of laterally movable wedge-friction elements D—D; transversely extending horizontal spring bolt E; two transversely disposed springs F—F, one on either side of the draft sills; a pair of spring followers G—G; a pair of spring caps or washers at the ends of the bolt E, only one of such caps H being shown; and a central, friction plate or partition J, disposed within the casing A.

The casing A is of hollow box-like form, open at each end, and having top and bottom walls 17—17 and vertical side walls 18—18. Said casing is provided with longitudinally extending grooves on the inner sides of the top and bottom wall 17, as indicated at 19 to accommodate the partition J which extends longitudinally of the casing and centrally thereof. Each of the said walls 18 of the casing A is centrally apertured as indicated at 20 to accommodate the bushing or sleeve 21 of the corresponding spring follower G which encircles the bolt E and, preferably, each side wall is provided with an inwardly extended annular flange 22 forming a guide for the sleeve section 21 of the spring follower G. As clearly appears from Figure 1, the draft sills are provided with elongated horizontally extending slots 23 to accommodate the longitudinal movement of the bolt and spring followers G.

The four longitudinally movable wedge friction elements B and C are of like construction, each having a transverse end face 24 bearing upon the respective follower 14 or 15, an inner longitudinally extending flat friction face 25 co-operable with the corresponding adjacent face of the partition J, and an outer wedge face 26 inclined toward the center of the mechanism. The two wedge blocks B—B are arranged, one on each side of the central partition or plate J and the same is also true of the rear pair of wedge blocks C. The partition J has a centrally disposed elongated opening 27 having top and bottom parallel edges and rounded ends 28—28. Each of the wedge blocks B and C is provided at its end nearest the center of the mechanism with a semi-circular flange or abutment 29 which projects toward the median longitudinal plane of the mechanism and within the recess 27 of the partition J so that, when the parts are in their normal position, the plate J will be positively centered.

The two friction elements D are of like construction, each having a pair of wedge faces 30—30 symmetrically arranged with respect to the axis of the bolt E and converged toward the center of the mechanism. Said wedge faces 30 cooperate with the corresponding adjacent wedge faces 26 of the blocks B and C. On its outer side, each friction element D is formed with a socket 31, within which are accommodated the sleeve portions 21 of the spring followers G and the guiding flanges 22 of the casing A so that the friction elements D are adapted for lateral movement, that is, in a direction transverse to the line of applied force. It will also be noted that the friction elements D are thus prevented from shifting longitudinally with respect to the casing A.

The springs F are applied to the bolt E, one on each side of the pair of draft sills. Each spring is interposed between a spring follower G and the spring-cap or washer H secured to the corresponding outer end of the bolt.

The operation of the mechanism is as follows, assuming an inward or buffing movement of the drawbar. As the drawbar moves inwardly, the front follower 14 is carried in unison therewith, thus forcing the front pair of wedge friction elements B toward the right, as viewed in Figure 1. This action induces a lateral separation of the two friction elements D and simultaneously a corresponding longitudinal movement of the friction elements D with respect to the two rear wedge friction elements C. In addition to the friction thus generated between the sets of friction elements B, C and D, friction is simultaneously generated between all of the four elements B and C, on the one hand, and the central partition J, on the other hand. Lateral separation of the friction elements D is obviously yieldingly resisted by the two springs F. With the arrangement shown and described, it is evident that I obtain a large amount of friction wearing areas, thus enabling me to obtain high frictional capacity without the use of excessively keen wedging angles.

Preferably, each of the wedge friction elements B and C will be provided with a transverse shoulder 32 adapted to engage with the correspondingly adjacent flat end 33 of one of the friction elements D, when the parts are in full compression, to thereby limit the movement of the parts and to provide a rigid column for transmitting the ultimate shocks to the draft sills.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a casing open at each end and having a longitudinally extending partition therein; of a spring resistance compressible in a direction transverse to the line of applied force; oppositely arranged longitudinally movable friction elements co-operable with said partition and movably retained thereby; other friction elements co-operable with said first named friction elements and movable in a direction transverse to the line of applied force; and means interposed between said second named friction elements and the spring resistance for effecting compression of the latter during a compression stroke of the mechanism.

2. In a friction shock absorbing mechanism, the combination with a casing open at its ends and having a longitudinally extending partition therein; of oppositely arranged, longitudinally movable friction elements cooperable with said partition and retained for limited longitudinal movement with respect thereto; and a spring resistance compressible in a direction transverse to said friction elements, including means yieldably bearing on said friction elements.

3. In a friction shock absorbing mechanism, the combination with a casing; of a longitudinally arranged and centrally disposed friction plate within said casing, said plate having a centrally disposed aperture therein; a plurality of sets of longitudinally movable friction elements on opposite sides of and co-operable with said plate, said elements having abutments in engagement with the walls of said aperture when the parts are in full release position; a spring resistance; and means interposed between said friction elements and said spring resistance for effecting compression of the latter upon actuation of said friction elements.

4. In a friction shock absorbing mechanism, the combination with a casing; of a centrally disposed friction plate within said casing; a spring bolt extending transversely through said plate and casing; guide means on said casing for said bolt, said guide means holding the bolt against movement longitudinally of the casing but permitting lateral movement thereof; a spring mounted on said bolt; oppositely arranged end sets of wedge-friction elements co-operable with said plate and movable lengthwise thereof; and laterally movable friction elements co-operable with said end friction elements and interposed between the latter and said spring resistance.

5. In a railway draft rigging, the combination with draft sills having stop-acting means and front and rear follower-acting means; of a shock absorbing mechanism interposed between said follower-acting means, said mechanism including: a spring bolt extended transversely through the sills and movable longitudinally with respect thereto; a casing between the sills and follower-acting means and through which said bolt is also extended, a longitudinally extending friction plate within said casing; a front pair of wedge friction elements co-operable with said plate; a rear set of wedge friction elements co-operable with said plate; laterally movable wedge friction elements within the casing, co-operable with said end sets of wedge friction elements; a spring mounted on each end of said bolt on the outer sides of the draft sills; and means between each of said laterally movable friction elements and the corresponding adjacent spring for effecting compression of the latter upon relative separation of the laterally movable friction elements.

6. In a friction shock absorbing mechanism, including a longitudinally extending floating friction member; front and rear sets of oppositely arranged, longitudinally movable friction elements cooperable with said member, said front and rear sets of friction elements and said partition being provided with inter-engaging means to limit the longitudinal outward movement of said friction elements with reference to said member and for centering said member upon release of the mechanism; laterally movable friction elements co-acting with said longitudinally arranged friction elements; and yieldable means arranged to bear upon said laterally movable friction elements.

7. In a friction shock absorbing mechanism, the combination with a casing open at its ends and having a longitudinally extending partition therein; a plurality of sets of longitudinally movable friction elements on opposite sides of and cooperable with said partition, said partition and said friction elements having inter-engaging means to limit the longitudinal movement with reference to each other; laterally movable friction elements arranged to bear on said longitudinally disposed friction elements; means on said casing preventing longitudinal movement of said laterally disposed friction elements with reference thereto; and means arranged to yieldably press said laterally movable friction elements into engagement with said longitudinal elements.

8. In a friction shock absorbing mechanism, the combination with a casing open at its ends and having a longitudinally extending partition therein; a plurality of sets of longitudinally movable friction elements on opposite sides of and cooperable with said partition, said partition and said friction elements having inter-engaging means to limit the longitudinal movement with reference to each other; laterally movable friction elements arranged to bear on said longitudinally disposed friction elements; means on said casing preventing longitudinal movement of said laterally disposed friction elements with reference thereto; bearing means mounted for lateral movement with reference to said casing and adapted to engage said laterally movable friction elements; a spring bolt mounted in said bearing means; and a spring resistance carried by said spring bolt and arranged to exert pressure on said bearing means.

9. In a friction shock absorbing mechanism, including a central partition; oppositely arranged sets of friction elements. coacting with said partition, said partition and said elements being provided with inter-engaging abutments to limit the movement of said friction elements in engagement therewith; other friction elements disposed at an angle to said first mentioned friction element and arranged to bear thereon; and means yieldably holding said latter friction elements in operative engagement with said first mentioned friction elements.

In witness that I claim the foregoing I have hereunto subscribed my name this 30th day of June, 1923.

JOHN F. O'CONNOR.